US008323782B2

(12) United States Patent
Bellamy et al.

(10) Patent No.: US 8,323,782 B2
(45) Date of Patent: Dec. 4, 2012

(54) STRATIFIED CEMENTITIOUS COMPOSITE

(76) Inventors: Larry Arthur Bellamy, Christchurch (NZ); Leonard George McSaveney, Auckland (NZ); James Ronald Mackechnie, Christchurch (NZ)

( * ) Notice: Subject to any disclaimer, the term of this patent is extended or adjusted under 35 U.S.C. 154(b) by 494 days.

(21) Appl. No.: 12/520,846

(22) PCT Filed: Dec. 14, 2007

(86) PCT No.: PCT/NZ2007/000362
§ 371 (c)(1),
(2), (4) Date: Jun. 29, 2009

(87) PCT Pub. No.: WO2008/075973
PCT Pub. Date: Jun. 26, 2008

(65) Prior Publication Data
US 2010/0143696 A1 Jun. 10, 2010

(30) Foreign Application Priority Data
Dec. 20, 2006 (NZ) .................................... 552288

(51) Int. Cl.
*B28B 1/08* (2006.01)
*B32B 5/14* (2006.01)
*B32B 13/02* (2006.01)

(52) U.S. Cl. .......... 428/213; 428/218; 428/703; 264/71; 264/241

(58) Field of Classification Search .................. None
See application file for complete search history.

(56) References Cited

U.S. PATENT DOCUMENTS
2004/0148876 A1   8/2004   McManus et al.

FOREIGN PATENT DOCUMENTS

| | | |
|---|---|---|
| CN | 1587162 A | 3/2005 |
| EP | 0786283 B1 | 1/2003 |
| FR | 2234752 | 1/1975 |
| JP | 79016532 A | 6/1979 |
| JP | 11-077650 A2 | 3/1999 |
| JP | 2004-269340 A2 | 9/2004 |
| WO | WO 97/27982 A1 | 8/1997 |

*Primary Examiner* — Ramsey Zacharia
(74) *Attorney, Agent, or Firm* — Knobbe Martens Olson & Bear LLP

(57) ABSTRACT

The present invention relates to a method for forming a stratified cementitious body comprising placing a cementitious slurry comprising a cementitious binder, to form the body in a single pour and curing the slurry to form a stratified cementitious body. The method may also comprise the steps of mixing a cementitious binder and at least one aggregate material with water to form a slurry, pouring the slurry into a mold, allowing the slurry to stratify into layers under the influence of gravitational forces and/or buoyancy forces, optionally applying vibrations to the slurry to encourage the slurry to stratify into layers, and curing the slurry to form a stratified cementitious body.

56 Claims, 3 Drawing Sheets

STRATIFIED CEMENTITIOUS COMPOSITE

RELATED APPLICATIONS

This application is a U.S. National Phase of International Application No.: PCT/NZ2007/000362, filed Dec. 14, 2007, designating the U.S. and published in English on Jun. 26, 2008 as WO 2008/075973, which claims the benefit of New Zealand Application No. 552288, filed Dec. 20, 2006.

FIELD OF THE INVENTION

The present invention relates to stratified cementitious bodies and methods for their production and in particular, but not limited to, stratified solid concrete panels.

BACKGROUND TO THE INVENTION

The physical and chemical properties of cementitious bodies are varied to suit the requirements of a range of applications. For example, cementitious bodies are formed into panels for use in the construction of walls, floors, ceilings and roofs. The panels are usually made of concrete which is formed by mixing a slurry of cement and aggregate material and/or sand. The slurry is cast into a mold and cured to form a solid concrete panel.

It is known that by controlling the composition of the slurry the physical properties of the solid panel can be predetermined. For example, by casting a slurry containing dense aggregate materials a panel with improved structural properties results. Alternatively by casting a slurry containing light weight aggregate materials a panel with improved thermal and acoustic insulation properties results.

Multi-layered concrete panels are formed by casting and curing a first layer of concrete and then casting and curing subsequent layer(s) of concrete atop the first layer. By pouring multiple layers of concrete the physical properties of the concrete panel can be refined. For example a panel can have a first layer of light weight aggregate material to provide thermal insulation and a second layer of dense aggregate material to provide structural strength. However, these multilayered panels are expensive to produce as they require multiple casting and curing steps. Further, there are performance weaknesses associated with the boundaries between the successive concrete layers.

In this specification, where reference has been made to external sources of information, including patent specifications and other documents, this is generally for the purpose of providing a context for discussing the features of the present invention. Unless stated otherwise, reference to such sources of information is not to be construed, in any jurisdiction, as an admission that such sources of information are prior art or form part of the common general knowledge in the art.

OBJECT OF THE INVENTION

It is an object of the present invention to provide a stratified cementitious body which overcomes or at least ameliorates some of the abovementioned disadvantages or which at least provides a useful choice.

SUMMARY OF THE INVENTION

In a first broad aspect the present invention provides a method for forming a stratified cementitious body which comprises placing a cementitious slurry comprising a cementitious binder, to form the body in a single pour and curing the slurry to form a stratified cementitious body.

In a second aspect the present invention provides a stratified cementitious body formed in a single pour from a cementitious slurry comprising a cementitious binder, the slurry having:
a yield shear stress of less than about 300 Pa; and
a plastic viscosity of less than about 70 Pa·s.

In a third aspect the present invention provides a method of forming a stratified cementitious body comprising the steps of:
mixing a cementitious binder and at least one aggregate material with water to form a slurry;
pouring the slurry into a mould;
allowing the slurry to stratify into layers under the influence of gravitational forces and/or buoyancy forces;
optionally applying vibrations to the slurry to encourage the slurry to stratify into layers; and
curing the slurry to form a stratified cementitious body.

Preferably a more dense and a less dense aggregate material are mixed with the cementitious binder and water to form the slurry.

Preferably the more dense aggregate material is selected from slag, greywacke, basalt and steel fibres.

Preferably the less dense aggregate material is selected from expanded glass, pumice, perlite, vermiculite, polystyrene, stabilised foam and plastic fibres.

Preferably the slurry is formed so that it stratifies into layers under the influence of gravitational forces and buoyancy forces.

Preferably the slurry is formed so that it stratifies into layers under the influence of gravitational forces urging the more dense aggregate material to settle to the bottom of the slurry.

Preferably the slurry is formed so that it stratifies into layers under the influence of buoyancy forces urging the less dense aggregate material to migrate to the top of the slurry.

Preferably the yield shear stress and plastic viscosity of the slurry are controlled to cause the slurry to stratify into layers.

Preferably the layers of the stratified slurry are substantially homogeneous.

Preferably where the ratio of the relative densities of the more dense aggregate material to the less dense aggregate material is between about 12:1 to about 8:1, preferably about 10:1, the yield shear stress is less than about 150 Pa, preferably less than about 100 Pa; and/or the plastic viscosity is between about 8 Pa·s to about 30 Pa·s, preferably between about 8 Pa·s to about 25 Pa·s.

Preferably where the ratio of the relative densities of the more dense aggregate material to the less dense aggregate material is between about 2:1 to about 7:1, preferably about 4:1, the yield shear stress is less than about 75 Pa, preferably less than about 50 Pa; and/or the plastic viscosity is between about 8 Pa·s to about 25 Pa·s, preferably between about 8 Pa·s to about 15 Pa·s.

Preferably the slurry is substantially homogeneous prior to the step of allowing the slurry to stratify.

Advantageously the cementitious slurry of the present invention has a rheology such that upon application of vibrations to the slurry, the slurry stratifies into layers in less than 1 minute.

Preferably vibrations are applied to the slurry for about 30 seconds at a vibrational frequency of about 2500 rpm.

Optionally the method of the present invention may be repeated to form a multi-layered cementitious body.

Alternatively or additionally the cementitious binder comprises or includes an inorganic polymer binder. Preferably where the cementitious binder comprises or includes an inorganic polymer binder the mixture is vibrated for about 60 seconds at 2500 rpm.

A fourth aspect the present invention provides a cured stratified cementitious panel comprising:
  a more dense aggregate layer forming about one third of the overall thickness of the panel (the structural layer); and
  a less dense aggregate layer forming about two thirds of the overall thickness of the panel (the insulating layer);
the stratified cementitious panel having been formed from a slurry in a single pour, said slurry comprising a cementitious binder, the more dense aggregate, the less dense aggregate and water.

A fifth aspect the present invention provides a cured stratified cementitious panel comprising:
  a more dense aggregate layer forming about one third of the overall thickness of the panel (the structural layer); and
  a less dense aggregate layer forming about two thirds of the overall thickness of the panel (the insulating layer);
the stratified cementidous panel having been formed from a slurry as defined in the second aspect, in a single pour, said slurry comprising a cementitious binder, the more dense aggregate, the less dense aggregate and water.

Preferably the cementidous body or panel is stratified into at least two layers. More preferably the composition of each of the at least two layers is substantially homogeneous.

Preferably the aggregate material has a high specific heat property. More preferably the aggregate material with the high specific heat property forms the structural layer.

In another aspect the present invention provides a stratified cementitious body produced according to any one of the methods of the first, second and/or third aspects of the invention.

Other aspects of the invention may become apparent from the following description which is given by way of example only and with reference to the accompanying drawings.

As used herein the term "and/or" means "and" or "or", or both.

As used herein "(s)" following a noun means the plural and/or singular forms of the noun.

The term "comprising" as used in this specification means "consisting at least in part of". When interpreting statements in this specification which include that term, the features, prefaced by that term in each statement, all need to be present but other features can also be present. Related terms such as "comprise" and "comprised" are to be interpreted in the same manner.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7).

The entire disclosures of all applications, patents and publications, cited above and below, if any, are hereby incorporated by reference.

BRIEF DESCRIPTION OF THE DRAWINGS

The invention will now be described by way of example only and with reference to the drawings in which.

DETAILED DESCRIPTION

As used herein the term 'single pour' refers to both a cured and an uncured cementitious mixture that has been poured or cast into a mould in a single step.

As used herein the term "cementitious" refers to cured and uncured mixtures including a cement binder and an aggregate. The cement binder may be a traditional cement, such as a Portland cement or a hydraulic cement, comprising a mixture of calcined limestone and clay. Alternatively the cement binder may be an inorganic polymer cement comprising a mixture of a water soluble alkali silicate and an aluminosilicate. The aggregate may be any one or more of sand, gravel, crushed stone, glass or recycled concrete or light weight aggregate such as expanded glass, pumice, perlite, vermiculite, polystyrene, stabilised foam and plastic fibres.

One or more other chemicals or additives may be added to the mixture. For example, organic or inorganic density modifiers, viscosity modifiers, fire retardants, waterproofing agents, silica fume, geothermal silica, thickeners, pigments, colorants, plasticizers, dispersants, forming agents, flocculent, drainage aids, wet and dry strength aids, silicone materials, aluminium powder, clay, kaolin, alumina trihydrate, mica, metakaolin, calcium carbonate, wollastonite, or polymeric resin emulsions, latex and acrylic polymers.

Figure 1:
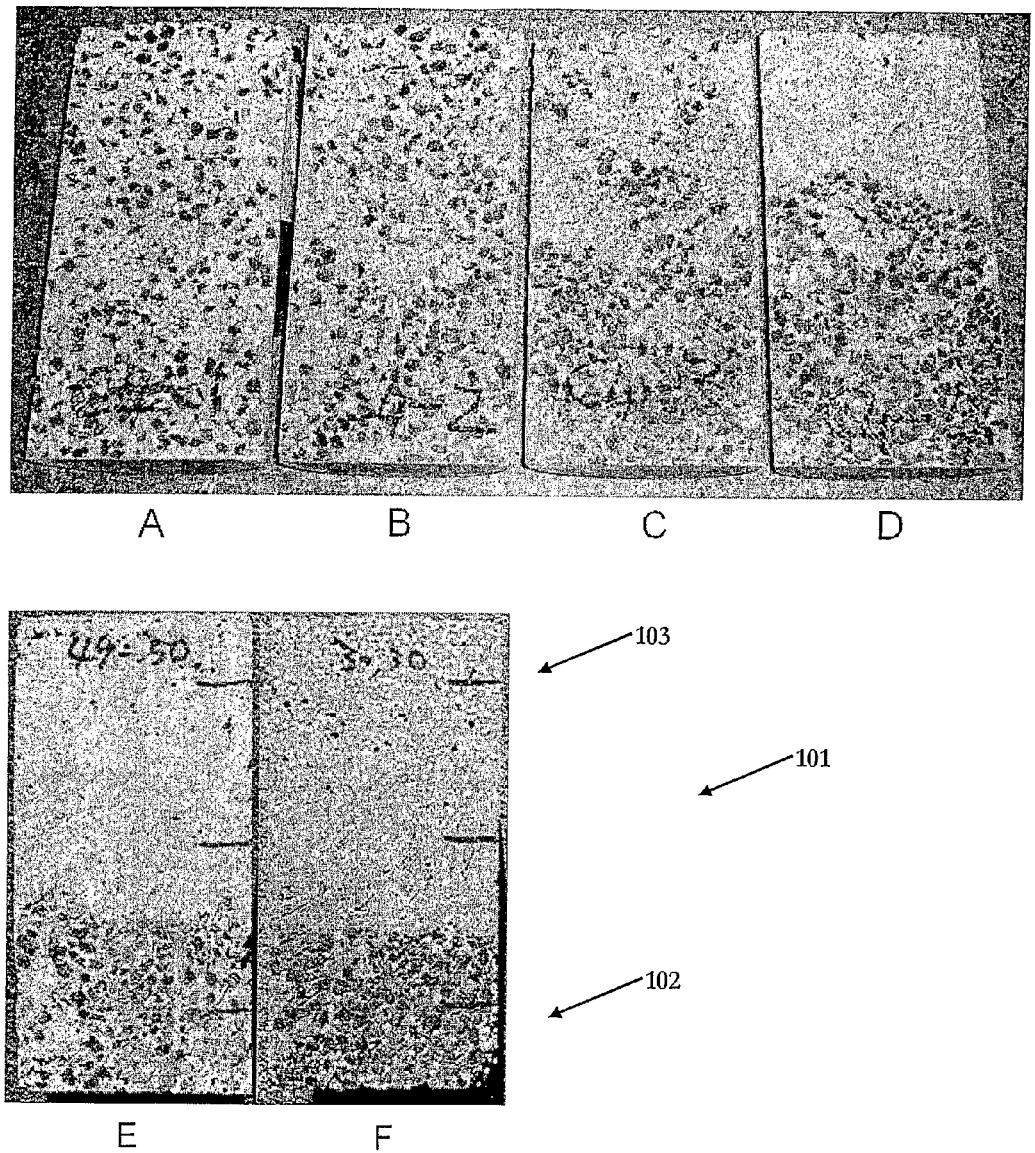
FIG. 1 is a series of cross sectional views of cured cementitious samples A-F prepared from slurries having different rheologies. The cross sections show the increasing degree of stratification from sample A to sample F.

The stratified cementitious bodies of the present invention are typically concrete panels having at least two layers. Sample F of FIG. 1 is cross section of a preferred cured stratified concrete body 101 of the present invention. The body 101 comprises a structural layer 102 and an insulating layer 103. The structural layer 102 comprises a denser aggregate material and has an improved strength and Modulus of Rupture. The insulating layer 103 comprises a less dense aggregate material and has improved thermal and acoustic insulating properties.

The structural layer 102 provides the cured concrete body with the strength required for use as a column, support, beam, floor panel, wall panel or ceiling panel. Desirably the particles in the structural layer will be selected from one or more of slag, greywacke, basalt and steel fibres.

Preferably the aggregate material has a high specific heat property. The inventors have found that specific heat property aggregates allow thinner cementitious bodies to be produced while retaining the same thermal mass. More preferably the aggregate material with the high specific heat property forms at least part of the structural layer. A high heat capacity aggregate may be any material having a relative density greater than 2.75 (eg. basalt, phonolite, slag)

The insulating layer 103 provides the concrete body with thermal and acoustic insulating properties. Desirably the particles in the insulating layer will be selected from one or more of pumice, expanded glass, perlite, vermiculite, polystyrene, stabilised foam and plastic fibres.

The stratified cementitious bodies of the present invention can be formed by a single pour process as described below:

A cement binder and an aggregate are mixed with water to form a slurry. Any number of conventional mixers such as rotating mixers, ribbon mixers or orbiting screw mixers can be used. The mixing is performed for a time sufficient to ensure homogeneity of the slurry.

The quantities of the cement, aggregate and/or water are varied to control the rheology of the slurry. Additionally any modifying agent(s) as referred to previously may be added to control the rheology of the slurry. The rheology of the slurry is kept sufficiently fluid to allow the stratification of the slurry after casting.

Table 1 below contains indicative yield shear stress and plastic viscosity values for different slurry compositions of the present invention. The values in Table 1 are for a concrete slurry including a hydraulic cement binder. Alternatively, where the cement binder is an inorganic polymer cement a higher yield shear stresses in excess of 150 Pa·s is possible.

TABLE 1

| Rheological Property | Range limit | Slag/Expanded glass (Density Ratio - 10/1) | Greywacke/Pumice (Density Ratio - 4/1) |
|---|---|---|---|
| Yield shear stress (Pa) | Rough | <150 | <75 |
| | Narrow | <100 | <50 |
| Plastic viscosity (Pa · s) | Rough | <30 | <25 |
| | Narrow | <25 | <15 |

Reference to "Narrow" and "Rough" in Table 1 above generally relates to optimal and sub-optimal limits of the parameters recited but which still allow stratification performance of the concrete from the slurry.

The slurry is poured into a mould. The rheology of the slurry allows the mixture to stratify into layers according to the density of the particles under the influence of gravity. The gravitational forces act on the denser aggregate material present in the slurry causing the denser material to settle to the bottom of the slurry.

Additionally or alternatively buoyancy forces act on the lighter aggregate material present in the slurry causing the lighter material to migrate to the top of the slurry. By controlling the rheology of the slurry the settling of the denser aggregate material and/or the migrating of the lighter aggregate material can be controlled. It is desired that settling of aggregate may occur under vibration when the yield stress is exceeded and the cementitious slurry is then theologically altered to behave like a liquid. Under storage conditions and during cementitious slurry or concrete curing operations, the cementitious slurry is preferably too stiff and behaves like a solid, thereby preventing settlement of heavy aggregate particles.

Additionally vibrations may be applied to the slurry to facilitate stratification of the slurry. For example, a vibrating table system may be used. Alternatively, a tilting table with shutter mounted vibrators may achieve the desired effect. A vibrating table operated at between about 2500-3500 rpm generating vertical accelerating of about 407 g, with an amplitude of about 0.1 mm may be utilised.

In an exemplary embodiment the concrete slurry is vibrated at an intensity of about 2500 rpm for about 30 seconds. For concrete slurries containing inorganic polymer binders a longer vibration at higher intensity (typically vibrated for 60 seconds at 3500 rpm) is able to stratify concrete with plastic viscosity levels above 150 Pa·s. It will be appreciated that in addition to rotating mixers, other mixers, for example oscillating mixers, are also suitable for use with the present invention. Therefore references to measurements in revolutions per minute (rpm) are to be read as also including measurements in cycles per minute (cpm).

It is believed that once a concrete slurry has a reasonable level of flow (slump flow diameter greater than 450 mm indicative of low yield shear stress), stratification should be possible provided the slurry contains components of different density. Slump flow testing was carried out using an Abrams cone used in accordance with NZS 3112 Part 1:1986 Section 11 ('Determination of the spread of concrete'), equivalent to ASTM C1611-05 ('Measurement of the slump flow of fresh concrete') and EN 12350:2000—Part 8 ('Measurement of the slump flow of fresh concrete'). Generally, though not precisely, the slump flow test requires an inverted Abrams slump concrete cone which is filled with concrete and the spread or flow of the concrete is measured horizontally, rather than the height drop as is done with the common slump test.

After pouring and vibrating the slurry is left for a time sufficient to cure the slurry to form a solid stratified cementitious body. The curing may be facilitated by the application of pressure, heat or light.

EXAMPLES

The following examples further illustrate the invention. Six concrete bodies (A, B, C, D, E and F in FIGS. 1 to 3) were prepared from concrete slurries with different rheologies according to the following steps:

1. A cementitious binder, waste slag aggregate and expanded glass bead aggregate were mixed with water for 5 minutes using a rotating pan mixer to form a slurry.
2. The slurry was poured into a cylindrical mould having a diameter of 100 mm and a height of 200 mm.
3. The moulds were vibrated or 30 seconds at 2500 rpm.
4. The slurry was left for 7 days at room temperature to set.

The cured concrete bodies were cut open with a diamond cutter to reveal their cross sections. The cross sections were assigned a stratification grading from 'none' through to 'excellent' based on the visual evidence of the cross section.

FIG. 1 shows the cross sections of cured Samples A through F. Sample A was completely homogeneous and exhibited no stratification. Sample B displayed slight stratification at the top of the sample only. Sample C displayed reasonable stratification of the top third of the body but below remainder of the body was mixed. Sample D displayed good stratification of the top third of the body but the remainder of the body was mixed. Sample E showed good stratification of the phases within the sample with only a small mixed zone. Sample F showed excellent stratification with defined phase and clear boundaries. The waste slag aggregate formed the denser bottom layer and the expanded glass bead aggregate formed legs dense the top layer.

The yield shear stress and plastic viscosity of the uncured slurries of Samples A to F prior to stratification were measured using a co-axial concrete viscometer.

The flow diameter of an inverted slump cone after 10 seconds was measured (slump flow testing). Initially concrete mixes were assessed for stratification potential based on the flow diameter achieved during initial fresh testing. For concrete containing higher water contents (265-335 L/m$^3$) a slump flow between 450 and 550 mm was sufficient to ensure good stratification potential for slag and glass beads (relative densities of 3.0 and 0.3 respectively). This was due to the inherently low plastic viscosity of such mixes (typically less than 20 Pa·s) and the order of magnitude difference in aggregate densities.

Figure 2:
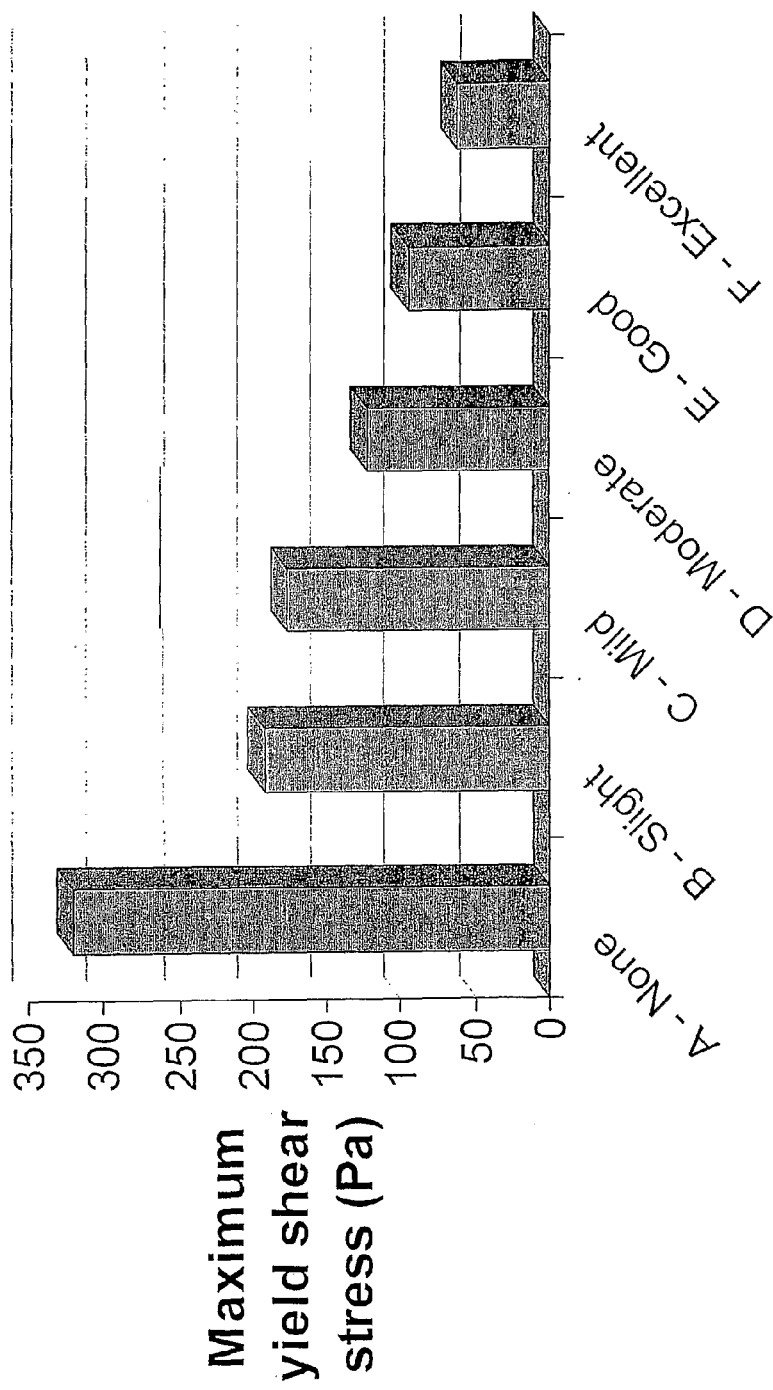
FIG. 2 is a graph of the maximum yield shear stress of the uncured cementitious samples A-F of FIG. 1 showing that decreasing the yield shear stress of the slurry increases the degree of stratification of the cured sample.
Figure 3:
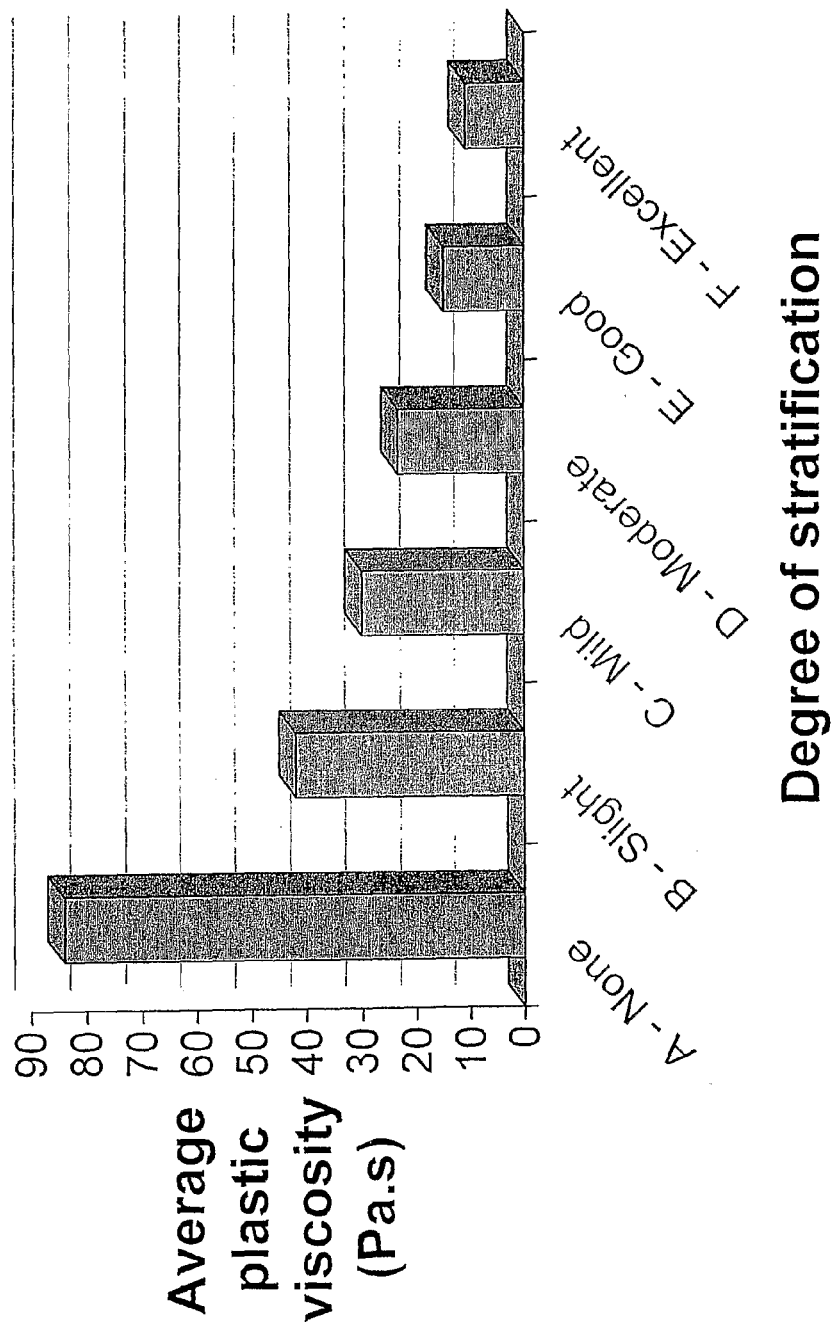
FIG. 3 is a graph of the average plastic viscosity of the uncured cementitious samples A-F of FIG. 1 showing that decreasing the plastic viscosity of the slurry increases the degree of stratification of the cured sample.

FIG. 2 shows the relationship between the maximum recorded yield shear stress and degree of stratification for the 70 mixes tested (typically 8-15 mixes per category).

Measuring yield shear stress was able to predict when stratification was not possible (i.e. above 100 Pa) but could not guarantee adequate stratification of concrete. Plastic viscosity values were therefore compared versus the resulting degree of stratification (average values shown in FIG. 3).

As a general rule, the plastic viscosity needed to be below 26 Pa·s to guarantee good to excellent stratification of concrete mixes containing slag and glass aggregate. Concrete mixes containing pumice and greywacke aggregate required slightly lower levels of plastic viscosity, typically below 20 Pa·s. It should be noted that concrete mixes became unstable and difficult to handle when plastic viscosity values were below 8 Pa·s.

The physical properties of the uncured stratified concrete slurries of Samples A to F were also assessed. A 10 mm diameter steel rod (300 mm long) was plunged into the uncured slurries and the depth of rod penetration was measured to assess the depth of the structural/denser layer (penetration testing).

Table 2 below relates the depth of the structural layer to the degree of stratification of the cured concrete body. As the penetration depth of the slurry increases, the degree of stratification of the cured concrete body increases.

TABLE 2

| Sample | Stratification rating | Visual evidence | Penetration Depth (mm) |
| --- | --- | --- | --- |
| A | None | Completely mixed light and heavy components | None |
| B | Slight | Slight stratification at the top of cylinder, mixed below | 5-15 |
| C | Mild | Stratified top third of cylinder but mixed components below | 15-30 |
| D | Moderate | Reasonable light top section, some mixing of components below | 30-60 |
| E | Good | Clear stratification of phases with small mixed zone | 60-120 |
| F | Excellent | Distinct stratification with defined phases and clear boundaries | >120 |

The stratified cementitious bodies of the present invention may be moulded into any number of shapes. For example the bodies may be formed into panels for use in the construction of walls, floors, ceilings and roofs. Alternatively the cementitious bodies may be used to create support beams and insulated water storage tanks.

The cementitious bodies may contain secondary materials, for example, steel rods may be embedded into the cementitious body to improve the strength of the cured body and/or plastic tubes may be embedded into the cementitious body to provide conduits for water or cables. The secondary materials may be embedded into the body by placing the secondary material into the mould before, during or after the cementitious slurry is poured into the mould.

Where in the foregoing description reference has been made to elements or integers having known equivalents, then such equivalents are included as if they were individually set forth.

Although the invention has been described by way of example and with reference to particular embodiments, it is to be understood that modifications and/or improvements may be made without departing from the scope or spirit of the invention, as defined by the claims.

In addition, where features or aspects of the invention are described in terms of Markush groups, those skilled in the art will recognise that the invention is also thereby described in terms of any individual member or subgroup of members of the Markush group.

The invention claimed is:

1. A stratified cementitious body formed in a single pour from a cementitious slurry comprising a cementitious binder, the slurry having:

a yield shear stress of less than about 300 Pa, and
a plastic viscosity of less than about 70 Pa·s,
wherein the cementitious slurry comprises a more dense and a less dense aggregate material mixed with the cementitious binder and water.

2. The cementitious body as claimed in claim 1, wherein the more dense aggregate material is selected from the group consisting of slag, greywacke, basalt and steel fibers.

3. The cementitious body as claimed in claim 1, wherein the less dense aggregate material is selected from the group consisting of expanded glass, pumice, perlite, vermiculite, polystyrene, stabilised foam and plastic fibers.

4. The cementitious body as claimed in claim 1, formed from the cementitious slurry that has stratified into layers under the influence of gravitational forces and buoyancy forces.

5. The cementitious body as claimed in claim 1, formed from the cementitious slurry that has stratified into layers under the influence of gravitational forces which urged the more dense aggregate material to settle to the bottom of the slurry.

6. The cementitious body as claimed in claim 1, formed from the cementitious slurry that has stratified into layers under the influence of buoyancy forces which urged the less dense aggregate material to migrate to the top of the slurry.

7. The cementitious body as claimed in claim 1, formed from the cementitious slurry which has stratified into layers by control of the yield shear stress and plastic viscosity of the cementitious slurry.

8. The cementitious body as claimed in claim 1, wherein the composition of each of the layers of the cementitious body are formed by layers of stratified slurry, which have compositions that are substantially homogeneous.

9. The cementitious body as claimed in claim 1, wherein the more dense aggregate material has a relative density greater than 2.75.

10. The cementitious body as claimed in claim 1, wherein the more dense aggregate material forms a structural layer.

11. The cementitious body as claimed in claim 1, wherein a ratio of the relative densities of the more dense aggregate material to the less dense aggregate material is between about 12:1 to about 8:1.

12. The cementitious body as claimed in claim 1, wherein a ratio of the relative densities of the more dense aggregate material to the less dense aggregate material is between about 2:1 to about 7:1.

13. The cementitious body as claimed in claim 1, wherein a ratio of the relative densities of the more dense aggregate material to the less dense aggregate material is about 10:1.

14. The cementitious body as claimed in claim 1, wherein a ratio of the relative densities of the more dense aggregate material to the less dense aggregate material is about 4:1.

15. The cementitious body as claimed in claim 1, wherein the yield shear stress of the slurry is less than about 150 Pa.

16. The cementitious body as claimed in claim 1, wherein the yield shear stress of the slurry is less than about 100 Pa.

17. The cementitious body as claimed in claim 1, wherein the yield shear stress of the slurry is less than about 75 Pa.

18. The cementitious body as claimed in claim 1, wherein the yield shear stress of the slurry is less than about 50 Pa.

19. The cementitious body as claimed in claim 1, wherein the plastic viscosity of the slurry is between about 8 Pa·s. to about 30 Pa·s.

20. The cementitious body as claimed in claim 1, wherein the plastic viscosity of the slurry is between about 8 Pa·s. to about 25 Pa·s.

21. The cementitious body as claimed in claim 1, wherein the plastic viscosity of the slurry is between about 8 Pa·s. to about 15 Pa·s.

22. The cementitious body as claimed in claim 1, formed from a cementitious slurry that was substantially homogeneous prior to the step of allowing the mixture to stratify.

23. The cementitious body as claimed in claim 1, wherein the cementitious body is a multi-layered stratified cementitious body.

24. The cementitious body as claimed in claim 1, wherein the cementitious binder of the slurry comprises or includes an inorganic polymer binder.

25. The cementitious body as claimed in claim 1, wherein said cementitious body is a cured stratified cementitious panel comprising:
   a more dense aggregate material layer forming about one third of the overall thickness of the panel and
   a less dense aggregate material layer forming about two thirds of the overall thickness of the panel,
   the stratified cementitious panel having been formed from a slurry in a single pour,
   said slurry comprising a cementitious binder, the more dense aggregate material, the less dense aggregate material and water.

26. The cured stratified cementitious panel as claimed in claim 25, wherein the body is stratified into at least two layers, wherein the layers are substantially homogeneous.

27. The cured stratified cementitious panel as claimed in claim 26, wherein the composition of each of the at least two layers is substantially homogeneous.

28. The cured stratified cementitious panel as claimed in claim 25, wherein the aggregate material has a relative density greater than 2.75.

29. The cured stratified cementitious panel as claimed in claim 25, wherein the more dense aggregate material forms a structural layer.

30. The cured stratified cementitious panel as claimed in claim 25, wherein the less dense aggregate material forms an insulating layer.

31. A method for forming a stratified cementitious body according to claim 1 comprising placing into a mold the cementitious slurry to form the body in a single pour and curing the slurry to form a stratified cementitious body.

32. The method of claim 31 further comprising the steps of:
   (i) mixing the cementitious binder and aggregate materials with water to form said slurry,
   (ii) allowing the slurry to stratify into layers in said mold under the influence of gravitational forces and/or buoyancy forces, and
   (iii) optionally applying vibrations to the slurry to encourage the slurry to stratify into layers.

33. The method as claimed in claim 32, wherein the slurry is substantially homogeneous prior to the step of allowing the slurry to stratify.

34. The method as claimed in claim 32, wherein upon application of vibrations to the slurry the slurry stratifies into layers in less than 1 minute.

35. The method as claimed in claim 32, wherein vibrations are applied to the slurry for about 30 seconds at a vibrational frequency of about 2500 rpm.

36. The method as claimed in claim 31, wherein the more dense aggregate material is selected from the group consisting of slag, greywacke, basalt and steel fibers.

37. The method as claimed in claim 31, wherein the less dense aggregate material is selected from the group consisting of expanded glass, pumice, perlite, vermiculite, polystyrene, stabilized foam and plastic fibers.

38. The method as claimed in claim 31, wherein the slurry is formed so that it stratifies into layers under the influence of gravitational forces and buoyancy forces.

39. The method as claimed in claim 31, wherein the slurry is formed so that it stratifies into layers under the influence of gravitational forces urging the more dense aggregate material to settle to the bottom of the slurry.

40. The method as claimed in claim 31, wherein the slurry is formed so that it stratifies into layers under the influence of buoyancy forces urging the less dense aggregate material to migrate to the top of the slurry.

41. The method as claimed in claim 31, wherein the yield shear stress and plastic viscosity of the slurry are controlled to cause the slurry to stratify into layers.

42. The method as claimed in claim 31, wherein layers of the stratified slurry are substantially homogeneous.

43. The method as claimed in claim 31, wherein a ratio of the relative densities of the more dense aggregate material to the less dense aggregate material is between about 12:1 to about 8:1.

44. The method as claimed in claim 31, wherein a ratio of the relative densities of the more dense aggregate material to the less dense aggregate material is between about 2:1 to about 7:1.

45. The method as claimed in claim 31, wherein a ratio of the relative densities of the more dense aggregate material to the less dense aggregate material is about 10:1.

46. The method as claimed in claim 31, wherein a ratio of the relative densities of the more dense aggregate material to the less dense aggregate material is about 4:1.

47. The method as claimed in claim 31, wherein the yield shear stress of the slurry is less than about 150 Pa.

48. The method as claimed in claim 31, wherein the yield shear stress of the slurry is less than about 100 Pa.

49. The method as claimed in claim 31 wherein the yield shear stress of the slurry is less than about 75 Pa.

50. The method as claimed in claim 31, wherein the yield shear stress of the slurry is less than about 50 Pa.

51. The method as claimed in claim 31, wherein the plastic viscosity of the slurry is between about 8 Pa·s to about 30 Pa·s.

52. The method as claimed in claim 31, wherein the plastic viscosity of the slurry is between about 8 Pa·s. to about 25 Pa·s.

53. The method as claimed in claim 31, wherein the plastic viscosity of the slurry is between about 8 Pa·s. to about 15 Pa·s.

54. The method as claimed in claim 31, wherein the slurry or cementitious binder comprises or includes an inorganic polymer binder.

55. The method as claimed in claim 54, wherein the slurry is vibrated for about 60 seconds at 2500 rpm.

56. The method as claimed in claim 31, wherein the method is repeated to form a multi-layered stratified cementitious body.

* * * * *